April 13, 1937.                R. R. CANDOR                2,076,809
                         REFRIGERATING APPARATUS
                         Filed Oct. 30, 1933         3 Sheets-Sheet 1

INVENTOR
Robert R Candor
BY
Spencer Hardman and Fehr
ATTORNEYS

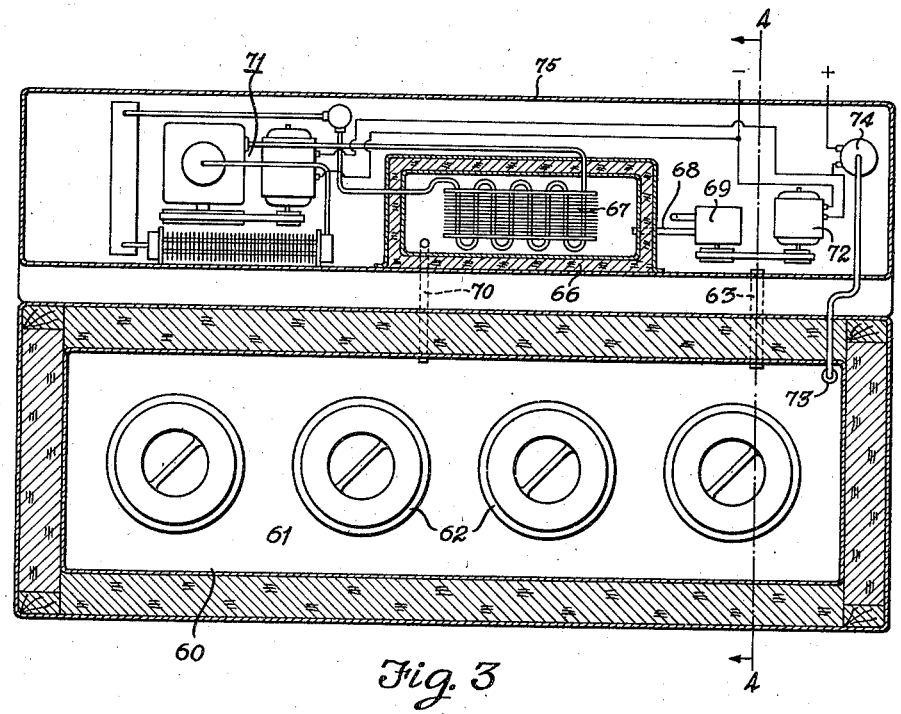
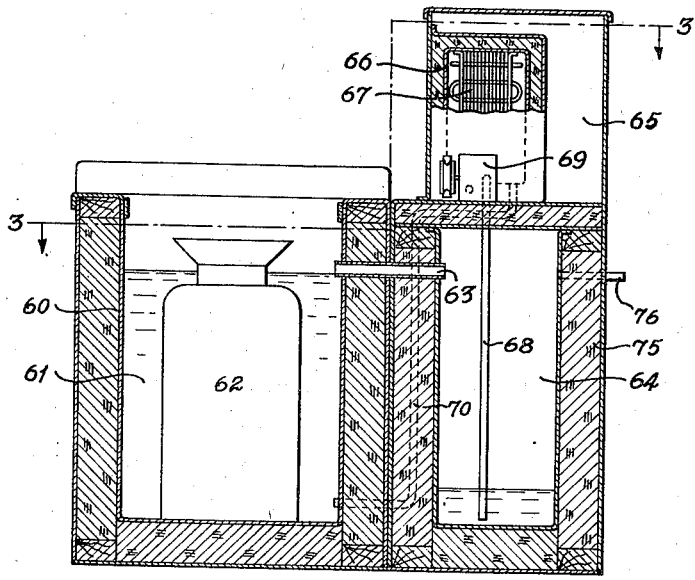

April 13, 1937.  R. R. CANDOR  2,076,809
REFRIGERATING APPARATUS
Filed Oct. 30, 1933   3 Sheets-Sheet 3

Patented Apr. 13, 1937

2,076,809

UNITED STATES PATENT OFFICE 2,076,809

REFRIGERATING APPARATUS

Robert R. Candor, Dayton, Ohio, assignor to General Motors Corporation, Dayton, Ohio, a corporation of Delaware Application October 30, 1933, Serial No. 695,767

6 Claims. (Cl. 62—101)

This invention relates to refrigerating apparatus, and more particularly to methods of and apparatus for cooling milk in milk cans.

Recently in many States and political sub-divisions laws have been passed requiring that milk be cooled to a temperature of 50° F. or lower within at least two hours after milking. This has made it necessary for many dairy farmers to install milk cooling apparatus. In order to cool this milk within such a short time it is necessary to remove a great amount of heat within a short time. To do this with a simple refrigerating apparatus would normally require a very large refrigerating unit.

It is an object of my invention to provide an apparatus for milk cooling in which a small compact unitary refrigerating apparatus is used to cool a large body of liquid, such as water, prior to the cooling of the milk so that a reservoir of stored cold liquid is available for rapidly cooling the milk within the required time.

It is a further object of my invention to provide an improved method and apparatus wherein the milk cans or other receptacles to be cooled are placed within a liquid bath from which the excess of liquid, including that displaced by the cans, overflows from the bath and is cooled by a refrigerating system and thereafter the cooled excess liquid is returned to the liquid bath.

It is another object of my invention to provide a small, compact, unitary refrigerant cooling structure which may be manufactured as a separate unit and connected to existing forms of liquid containers or tanks or to containers or tanks which are locally assembled for cooling milk and other substances.

Further objects and advantages of the present invention will be apparent from the following description, reference being had to the accompanying drawings, wherein a preferred form of the present invention is clearly shown.

In the drawings:

Fig. 3 is a sectional view taken along the line 3—3 of Fig. 4 disclosing a modified form of my invention;

Fig. 4 is a sectional view along the line 4—4 of Fig. 3;

Figure 1:
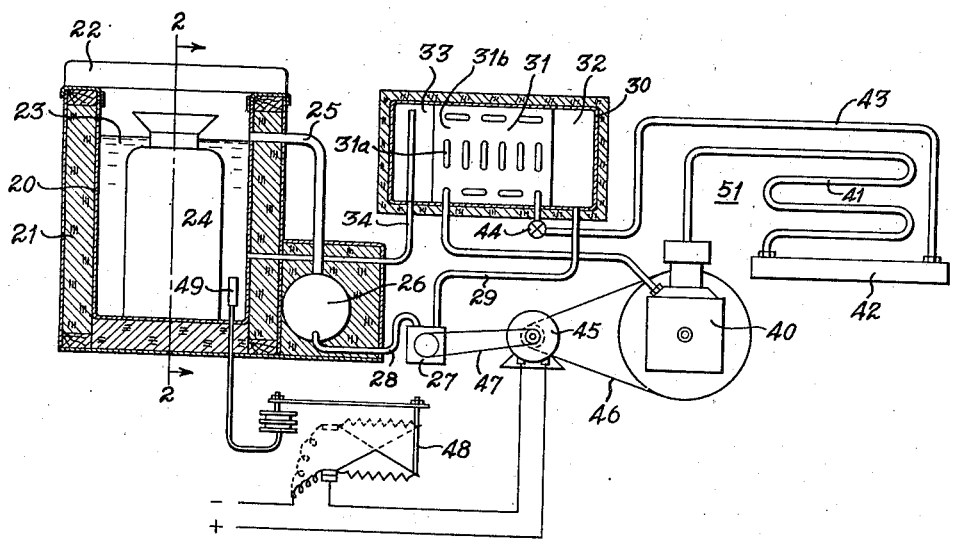
Fig. 1 is a sectional view partly diagrammatic of one form of my apparatus.

Referring to the drawings, and more particularly to Fig. 1, there is shown a liquid container or milk cooling tank 20 provided with insulated walls 21 and an insulating removable top cover 22. The tank 20 is provided with some suitable liquid or liquid bath 23, such as water, which receives a plurality of milk cans 24 or similar articles. It is desirable that the liquid level be maintained at the neck of the cans 24 and in order to do this I provide an overflow means in the form of a pipe 25 which conducts the excess of liquid over this desired level, which is displaced when the cans are placed in the bath, to an overflow receiver 26 in the form of a cylindrical tank. This overflow receiver is of sufficient capacity to receive all the liquid displaced by the maximum number of cans the liquid container 20 can accommodate. It is surrounded by insulating means so that little or no heat is transferred to the liquid within this receiver.

The liquid which overflows into the overflow receiver 26 is drawn through a pipe 28 by a liquid pump 27 and pumped through a pipe 29 to an insulated tank or chamber 30. The liquid pump is preferably provided with a check valve to prevent the liquid from leaking back through the pump and to keep the pump primed. Within this tank or chamber 30 there is provided an evaporating means 31 which is placed within the central portion of the chamber so that it provides a space on either side of the evaporating means. The pump discharges into the space 32 at one side of the evaporating means and the liquid within flows between the surfaces of the evaporating means to the chamber 33 on the opposite side of the tank or chamber 30. In passing between these surfaces of the evaporating means 31 the liquid is cooled. Any suitable type of evaporator may be used. For example, a coil structure having parallel runs of pipes joined by U-bends 31a may be provided with a plurality of parallel fins 31b between which the water flows.

As long as the pump 27 operates, the liquid fills the chamber or tank 30 and overflows into a return pipe 34 which has its inlet near the top of the chamber. The return pipe 34 returns the liquid to the liquid bath 23 in the liquid container 20.

The system is provided with enough liquid so that there is always an adequate amount of liquid present in the overflow receiver 26 regardless of the number of cans in the liquid container 20 to fill the evaporating chamber 30 and to cause some liquid to overflow into the return pipe to be conducted to the liquid bath 23 from which it overflows into the overflow receiver 26. Thus, when there are no cans within the system, there is preferably enough liquid in the system to fill the liquid bath 23 and the evaporating chamber 30 and, in addition, a small reserve in the overflow receiver 26 to insure a circulation of liquid whenever the liquid pump 27 operates. A convenient way of obtaining a satisfactory amount of liquid in the system is to provide the overflow receiver 26 with an overflow pipe or vent 56 and to so proportion the capacity of the various receptacles so that with the tank or liquid container 20 filled with the maximum number of milk cans 24, and while the system is in operation, water may be poured into the tank 20 until it overflows through the pipe or vent 56. When this occurs, the proper amount of liquid is in the system if all of the parts are properly primed.

The evaporating means 31 is provided with liquid refrigerant by a refrigerant liquefying means 51 comprising a compressor 40 for compressing the refrigerant evaporated within the evaporating means 31 and for forwarding the compressed refrigerant to a condenser 41 where the refrigerant is liquefied and collected in the receiver 42. The liquid refrigerant in the receiver 42 is then supplied to the evaporating means 31 through a supply conduit 43 under the control of a suitable expansion valve 44, preferably of the automatic type. The compressor 40 is preferably driven by an electric motor 45 through pulley and belt means 46. This compressor 45 also drives the pump 27 through a pulley belt means 47. The operation of the electric motor is controlled by a snap acting switch means 48 which is controlled by a thermostat 49 located within the liquid bath. Thus, whenever cooling is required, the thermostat closes the electric motor circuit causing the electric motor to operate so as to drive the compressor to operate the pump 27. This will cause the evaporator to be maintained at a relatively low temperature and the excess of liquid in the overflow receiver 26 will be pumped into the chamber 30 to be cooled and returned to the liquid bath, thus supplying the cold liquid to the liquid bath 23 and lowering its temperature.

Figure 2:
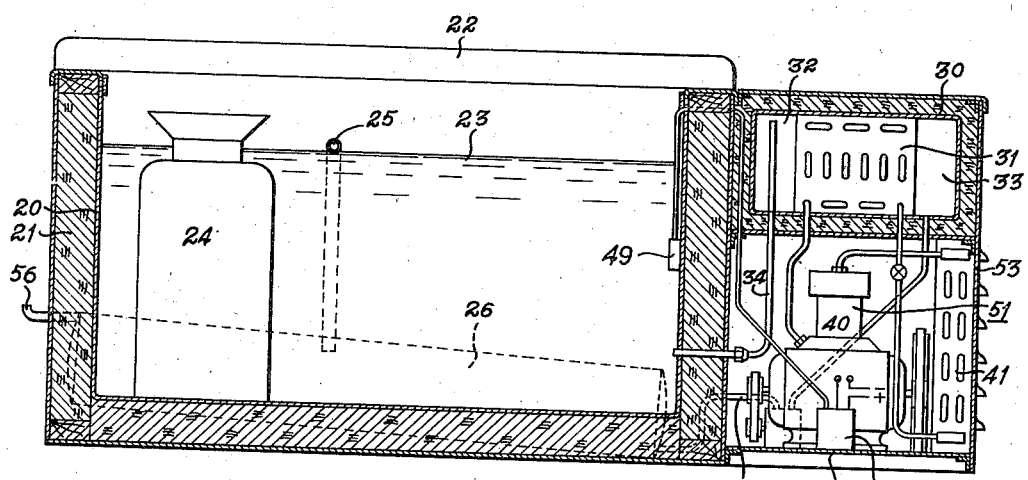
Fig. 2 is a sectional view along the line 2—2 of Fig. 1.

Referring now to Fig. 2, there is shown the refrigerant liquefying apparatus 51 mounted upon a platform or base 52 and enclosed within the lower portion of a cabinet 53 which is located at the side of the low cooling tank 20. In the upper portion of the cabinet 53 is the evaporating means 31 which cools the excess liquid from the liquid bath. This cabinet is preferably entirely separate from a tank 20 and is only connected thereto by the liquid conduit 28, the return conduit 34, and the thermostatic bulb. The refrigerating system is preferably entirely contained within the cabinet 53 so that it may be built as a unit and shipped separately from the tank 20. With this arrangement it is possible to use an existing milk cooling tank so that the cost of installation of electric refrigeration for milk cooling is reduced. By the use of this cooling system a small refrigerating unit is adequate since the large cooling capacity of the liquid bath may be drawn upon. The overflow arrangement insures the correct liquid level regardless of the number of cans to be used.

Referring now to Figs. 3 and 4, there is shown another form of my invention in which there is provided a liquid container or milk cooling tank 60 containing a liquid bath 61 containing the milk cans 62. The liquid container provides an overflow means in the form of a pipe 63 situated at about the height of the necks of the milk cans so that any liquid in the bath above that level, which is displaced by placing the milk cans in the liquid bath, will flow into the overflow receiving container 64 which is situated at one side of the bath. This overflow receiver 64 is of sufficient capacity to receive all the liquid displaced by the maximum number of cans and is a part of the unitary cabinet structure 75 which houses the entire refrigerating system which is mounted in a chamber 65 on top of the overflow receiver 64. Within this chamber 65 there is provided an insulated tank or chamber 66 containing a refrigerant evaporating means 67 for cooling the liquid. The excess liquid within the insulated overflow receiver is drawn through the suction pipe 68 by the liquid pump 69 and discharged into the tank 66 containing the evaporating means 67. This liquid is cooled by the evaporating means 67 and the excess of liquid over a certain level is returned to the liquid bath through a return conduit 70. In this way when the pump is in operation there is a constant supply of cold liquid to the liquid bath and the constant overflow from the liquid bath into the overflow receiver. The liquid pump is preferably provided with a check valve to prevent water from leaking back through the pump and to keep the pump primed.

The evaporating means 67 is supplied with liquid refrigerant by the refrigerant liquefying apparatus, generally designated by the reference character 71 which is similar to the liquefying apparatus 51 of Figs. 1 and 2. The pump 69 is driven by an electric motor 72. The operation of the pump 69 and the refrigerant liquefying apparatus 71 is controlled by a thermostatic bulb 73 located within the liquid bath 61, which bulb controls the operation of an electric switch 74 which in turn controls the operation of the pump 69 and the refrigerant liquefying apparatus 71.

The overflow receiver 64 and the refrigerating apparatus are all contained within a single unitary cabinet 75 which is entirely separate from the liquid container excepting for the overflow pipe 63, the return pipe 70, and the thermostatic bulb 73. Thus, such a refrigerating unit may be sold to one already having a milk cooling tank. The overflow receiver 64 is preferably provided with an overflow pipe or vent 76 similarly to the vent 56 of Fig. 2 so that the system may be conveniently filled with liquid as explained in connection with Figs. 1 and 2.

Figure 5:
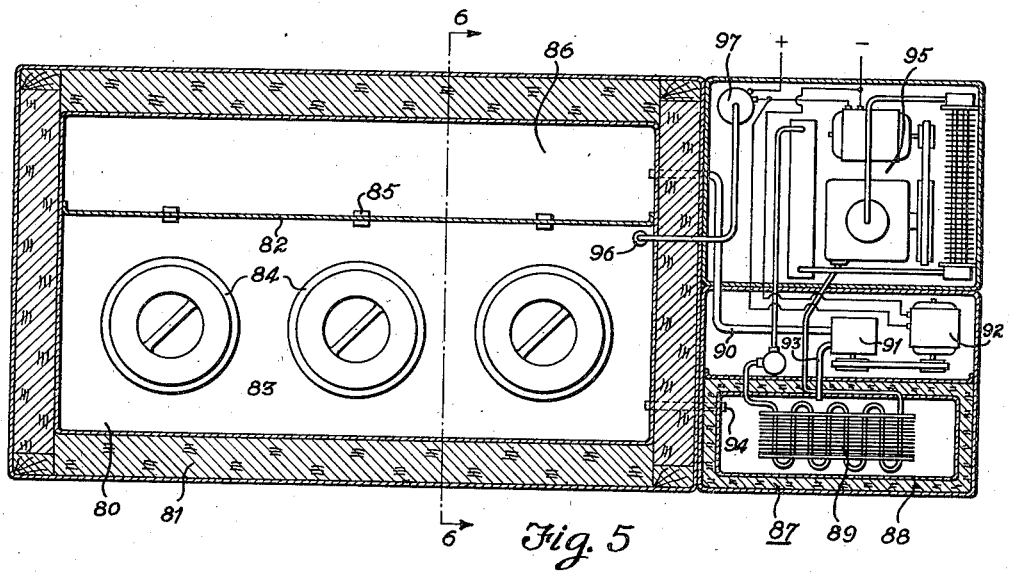
Fig. 5 is a sectional view of another form of my invention taken along the line 5—5 of Fig. 6.
Figure 6:
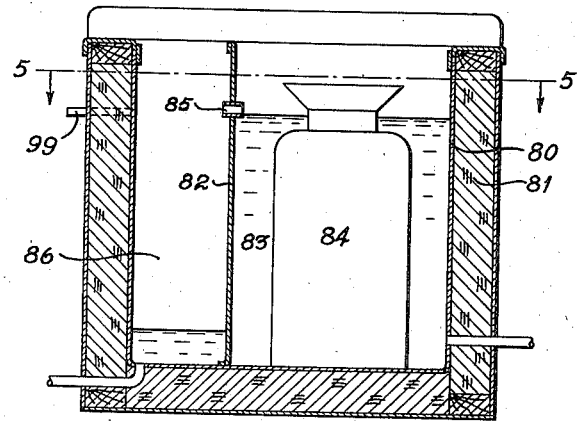
Fig. 6 is a sectional view taken along the line 6—6 of Fig. 5.

In Figs. 5 and 6 another form of my invention is shown. In this form there is provided a liquid container or milk cooling tank 80 provided with insulated walls 81. Within the tank there is provided a dividing plate 82, on one side of which is the liquid bath 83 containing the milk cans 84 to be cooled. Extending through the dividing plate 82 are the overflow pipes 85 which carry off any amount of liquid above the level of the neck of the milk cans. The excess liquid in the system including that displaced by the milk cans 84 is discharged into the overflow receiving chamber 86 which is on the opposite side of the dividing plate 82.

The overflow receiving chamber is of sufficient capacity to receive all the liquid displaced by the maximum number of milk cans accommodated within the liquid container 80 together with an additional amount to insure circulation when no milk cans are in the liquid container. In order to increase the capacity of the apparatus, the overflow receiving chamber 86 may be enlarged to accommodate additional milk cans or other articles to be cooled, thus making the entire space within the tank 80 available for cooling articles.

The overflow receiver 86 is preferably provided with an overflow pipe or vent 99 similar to the vent 56 of Figs. 1 and 2, so that the system may be conveniently provided with the proper amount of liquid and proper operation insured.

At one end of the liquid container or milk cooling tank, there is provided a liquid cooling apparatus which is housed in a cabinet 87 entirely separate from the milk cooling tank or liquid container 80. This cabinet 87 is provided with an insulated chamber or tank 88 containing a refrigerant evaporating means 89. Liquid from the overflow receiver 86 is pumped through a pipe 90 by the liquid pump 91 driven by an electric motor 92 through the pipe 93 into the evaporator chamber or tank 88 where it fills the chamber up to the level of the top of the return pipe 94. The liquid pump is preferably provided with a check valve at its inlet to keep the pump primed and to prevent the liquid from leaking back through the pump. The liquid is cooled within the evaporating chamber 88 by the evaporating means 89 and returns to the liquid bath by overflowing into the return conduit 94 which, by its position in the tank, maintains the liquid in the evaporator cooling tank at a certain high level.

Liquid refrigerant is supplied to the evaporating means 89 and vaporized refrigerant is withdrawn from the evaporating means by a refrigerant liquefying means 95 which is similar to the refrigerant liquefying means 51 described in the first form of my apparatus. The pump 91 and the liquefying apparatus 95 are controlled by the thermostatic bulb 96 which controls the operation of the electric switch 97 which in turn controls the operation of the pump 91 and the refrigerant liquefying apparatus 95. If desired, however, pump 91 may be manually controlled. In this form I have provided a complete refrigerating apparatus which is housed within a cabinet entirely separate from the liquid bath, the overflow means and overflow receiver. The refrigerating apparatus and the pump are so arranged within the cabinet to make it compact in order that as little space as possible is required.

With the forms of apparatus and with the method I have disclosed, the manufacture and installation of milk cooling equipment is made much easier. The milk cooling tank proper is of simple construction with smooth walls which may be easily cleaned. This portion of the apparatus is rather bulky and it is possible to build this portion of the apparatus at local points, while the more complex and highly mechanical refrigerating apparatus and pump is preferably built at a single centrally located point. This enables an improved type of milk cooling equipment to be completely installed at the lowest cost. This type of apparatus also makes it possible to use existing milk cooling tanks so that the cost of providing milk cooling equipment is considerably reduced.

While the form of embodiment of the invention as herein disclosed, constitutes a preferred form, it is to be understood that other forms might be adopted, all coming within the scope of the claims which follow.

What is claimed is as follows:

1. A cooling apparatus comprising a liquid container adapted to receive articles to be cooled, an overflow means separate from the liquid container including an insulated overflow receiving container for receiving the excess of liquid from the liquid container displaced when articles to be cooled are placed in the liquid container, said overflow receiving container having sufficient capacity to receive the maximum amount of liquid displaced by the maximum number of articles which can be accommodated in the liquid container, a cabinet separate from the liquid container, a separate unitary liquid cooling means within the cabinet, said cooling means comprising refrigerant liquefying and evaporating means connected in a closed system, said cabinet also containing means for withdrawing liquid from the overflow receiving container and then circulating the liquid in heat exchange relation with the evaporating means and returning the liquid to the liquid container.

2. A cooling apparatus comprising a liquid container adapted to receive articles to be cooled, a cabinet separate from the liquid container, said cabinet having an overflow receiving chamber for receiving the excess of liquid displaced when articles to be cooled are placed in the liquid container, said chamber having sufficient capacity to receive the maximum amount of liquid displaced by the maximum number of articles which can be accommodated in the liquid container, said cabinet also containing cooling means comprising refrigerant liquefying and evaporating means connected in a closed system, said cabinet also containing means for withdrawing liquid from the overflow receiving chamber, circulating the liquid in heat exchange relation with the evaporating means and returning the liquid to the liquid container.

3. A cooling apparatus comprising in combination, a liquid container adapted to receive a plurality of articles to be cooled, an overflow means including an insulated receptacle communicating with said liquid container for receiving the excess of liquid therefrom displaced when articles to be cooled are placed in the liquid container, said overflow receptacle having sufficient capacity to receive the maximum amount of liquid displaced by the maximum number of articles which can be accommodated in the liquid container, a second container separate from said first named container and adapted to receive liquid from said overflow receptacle, means for cooling liquid received in said second container, means for withdrawing liquid from the overflow receptacle and circulating the liquid to said second container and then returning the liquid to the first named liquid container, means for circulating a refrigerating fluid through said liquid cooling means, and means responsive to the temperature of liquid in said first named liquid container for simultaneously controlling the starting and stopping of said liquid withdrawing means and said refrigerating fluid circulating means.

4. A cooling apparatus comprising in combination, a liquid container adapted to receive a plurality of articles to be cooled, an overflow means including an insulated receptacle communicating with said liquid container for receiving the excess of liquid therefrom displaced when articles to be cooled are placed in the liquid container, said overflow receptacle having sufficient capacity to receive the maximum amount of liquid displaced by the maximum number of articles which can be accommodated in the liquid container, a second container separate from said first named container and adapted to receive liquid from said overflow receptacle, means for cooling liquid received in said second container, means for withdrawing liquid from the overflow receptacle and circulating the liquid to said second container and then returning the liquid to the first named liquid container, means for circulating a refrigerating fluid through said liquid cooling means, and means responsive to the temperature of liquid in one of said liquid containers for simultaneously controlling the starting and stopping of said liquid withdrawing means and said refrigerating fluid circulating means.

5. A cooling apparatus comprising in combination, a cabinet having a liquid container therein adapted to receive a plurality of articles to be cooled, an overflow receptacle communicating with said liquid container for receiving the excess of liquid therefrom displaced when articles to be cooled are placed in the liquid container, said receptacle having sufficient capacity to receive the maximum amount of liquid displaced by the maximum number of articles which can be accommodated in the liquid container, a separated cabinet including an insulated chamber adapted to receive liquid from said overflow receptacle and containing a cooling element for cooling liquid received therein, said separate cabinet also including means for withdrawing liquid from the overflow receptacle and circulating the liquid to said chamber and then returning the cooled liquid to said container, and means for circulating a refrigerating fluid through said cooling element.

6. A cooling apparatus comprising in combination, a liquid container adapted to receive articles to be cooled, a second container separate from said first named container and adapted to receive liquid therefrom, means for cooling liquid received in said second container, means for withdrawing liquid from said first named container and circulating the liquid to said second container and then returning the liquid to the first named container, means for circulating a refrigerating fluid through said liquid cooling means, and means responsive to the temperature of liquid in said first named container for simultaneously controlling the starting and stopping of said liquid withdrawing means and said refrigerating fluid circulating means.

ROBERT R. CANDOR.